(12) United States Patent
Nakamura et al.

(10) Patent No.: US 10,005,872 B2
(45) Date of Patent: Jun. 26, 2018

(54) ACTIVE ENERGY RAY-CURABLE COMPOSITION, ACTIVE ENERGY RAY-CURABLE PRINTING INK USING SAME, AND PRINTED MATTER

(71) Applicant: DIC Corporation, Tokyo (JP)

(72) Inventors: Yumiko Nakamura, Chiba (JP);
Yoshinobu Deguchi, Chiba (JP);
Keisuke Wakahara, Tokyo (JP);
Koichi Yamaguchi, Chiba (JP);
Tatsushi Okuda, Tokyo (JP)

(73) Assignee: DIC CORPORATION, Tokyo (JP)

( * ) Notice: Subject to any disclaimer, the term of this patent is extended or adjusted under 35 U.S.C. 154(b) by 0 days. days.

(21) Appl. No.: 15/519,993

(22) PCT Filed: Aug. 27, 2015

(86) PCT No.: PCT/JP2015/074202
§ 371 (c)(1),
(2) Date: Apr. 18, 2017

(87) PCT Pub. No.: WO2016/063625
PCT Pub. Date: Apr. 28, 2016

(65) Prior Publication Data
US 2017/0313804 A1    Nov. 2, 2017

(30) Foreign Application Priority Data

Oct. 24, 2014 (JP) ................. 2014-217264

(51) Int. Cl.
| | | |
|---|---|---|
| *C08F 2/46* | (2006.01) | |
| *C08F 2/50* | (2006.01) | |
| *C08G 64/04* | (2006.01) | |
| *C08F 290/06* | (2006.01) | |
| *C09D 11/101* | (2014.01) | |
| *C09D 11/102* | (2014.01) | |
| *C08F 299/06* | (2006.01) | |
| *C08G 18/40* | (2006.01) | |
| *C09D 175/16* | (2006.01) | |

(52) U.S. Cl.
CPC .......... *C08F 290/06* (2013.01); *C08F 299/06* (2013.01); *C09D 11/101* (2013.01); *C09D 11/102* (2013.01); *C08G 18/4018* (2013.01); *C09D 175/16* (2013.01)

(58) Field of Classification Search
CPC .... C08F 290/06; C08F 299/06; C09D 11/101; C09D 11/102; C09D 175/16; C08G 18/4018

USPC ............... 522/8, 7, 6, 71, 189, 184, 1; 520/1
See application file for complete search history.

(56) References Cited

U.S. PATENT DOCUMENTS

| | | | | |
|---|---|---|---|---|
| 4,174,307 A | * | 11/1979 | Rowe ................ | C08F 20/36 522/12 |
| 4,305,854 A | | 12/1981 | Rowe | |
| 2012/0252998 A1 | * | 10/2012 | Suda ................ | C08F 290/067 526/312 |
| 2013/0273467 A1 | * | 10/2013 | Ashizawa ......... | G03G 9/08755 430/108.4 |

FOREIGN PATENT DOCUMENTS

| | | | |
|---|---|---|---|
| JP | 48-41706 B1 | | 12/1973 |
| JP | 49-099195 A | | 9/1974 |
| JP | 04-077514 A | | 3/1992 |
| JP | 07-062057 A | | 3/1995 |
| JP | 2001-151848 A | | 6/2001 |
| JP | 2012-057031 | * | 3/2012 |
| JP | 2012-197436 A | | 10/2012 |

OTHER PUBLICATIONS

Seike et al, JP 2012-057031 Machine Translation, Mar. 23, 2012 (Year: 2012).*
Search Report issued in corresponding International Patent Application No. PCT/JP2015/074202, dated Nov. 24, 2015.

\* cited by examiner

*Primary Examiner* — Jessica Whiteley
(74) *Attorney, Agent, or Firm* — McDermott Will & Emery LLP

(57) ABSTRACT

The present invention provides an active energy ray-curable composition exhibiting high curability and having excellent offset printability when used for a printing ink, an active energy ray-curable printing ink having both excellent curability and offset printability, and a printed matter using the same. An active energy ray-curable composition includes a urethane (meth)acrylate resin (A) and a polymerization initiator (B), wherein the urethane (meth)acrylate resin (A) is produced by using an aromatic polyisocyanate (a), a hydroxyl group-containing mono(meth)acrylate (b), and a polyol (c) as essential reaction raw materials so that the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a) is within a range of 0.99 to 0.40, and the urethane (meth)acrylate resin (A) has a (meth)acryloyl group concentration within a range of 1.5 to 4.0 mmol/g.

6 Claims, No Drawings

ACTIVE ENERGY RAY-CURABLE COMPOSITION, ACTIVE ENERGY RAY-CURABLE PRINTING INK USING SAME, AND PRINTED MATTER

CROSS REFERENCE

This patent application is the U.S. National Phase under 35 U.S.C. § 371 of International Application No. PCT/JP2015/074202, filed on Aug. 27, 2015, which claims the benefit of Japanese Patent Application No. 2014-217264, filed on Oct. 24, 2014, the entire contents of each are hereby incorporated by reference.

TECHNICAL FIELD

The present invention relates to an active energy ray-curable composition useful as a raw material for an active energy ray-curable ink and the like. Further, the present invention relates to an active energy ray-curable printing ink using the composition and a printed matter.

BACKGROUND ART

An active energy ray-curable resin composition is used in various fields such as a hard coating agent for various plastic substrates of home electric appliances, cellular phones, and the like, an over-coating agent for paper and the like, a binder for printing inks, a solder resist, and the like from the viewpoint of the characteristics of little heat history to coating substrates and excellent hardness and scratch properties of coating films.

In the application to a binder for printing inks among these applications, an active energy ray-curable ink for offset printing attracts attention in view of a low environmental load, and a diallyl phthalate resin is currently widely used as a binder resin in view of excellent printability, little elution of low-molecular-weight components, and solubility in UV monomers.

However, the toxicity of diallyl phthalate used as a raw material of the diallyl phthalate resin has recently been pointed out, and thus there is increasing demand for a printing ink using an active energy ray-curable resin instead of the diallyl phthalate resin.

A urethane acrylate resin is known as an active energy ray-curable resin other than the diallyl phthalate resin, and the urethane acrylate resin is likely to be applied to printing inks in view of its excellent physical property balance and is produced by, for example, reacting a polyfunctional isocyanate compound with 2-hydroxyethyl acrylate at a ratio such that isocyanate groups are excessive, and then reacting the residual isocyanate groups of the resultant reaction product with acid diol and polyol (refer to Patent Literature 1).

The urethane acrylate resin produced by the production method does not contain 2-hydroxyethyl acrylate having high skin irritation and remaining in the resin and thus is excellent in safety and sanitation in handling printing inks. However, curability is inevitably decreased due to decrease in the concentration of functional groups in urethane acrylate, and offset printing has poor printability due to a high content of acid groups.

On the other hand, a resin known as a urethane acrylate resin having no acid group, for example, as a urethane acrylate resin for coating, is produced by reacting a polyfunctional isocyanate compound with a high-molecular-weight polyol such as polyester polyol or polyether polyol and then reacting the reaction product with 2-hydroxyethyl acrylate (refer to Patent Literature 2).

However, the urethane acrylate resin has a relatively high molecular weight for the purpose of improving resilience in coating application and has a small amount of modification of 2-hydroxyethyl acrylate from the viewpoint of imparting flexibility. Therefore, when used for printing ink application, satisfactory curability cannot be achieved, and also offset printing has poor printability.

CITATION LIST

Patent Literature

PTL 1: Japanese Unexamined Patent Application Publication No. 2001-151848
PTL 2: Japanese Unexamined Patent Application Publication No. 2012-197436

SUMMARY OF INVENTION

Technical Problem

Therefore, a problem to be solved by the present invention is to provide an active energy ray-curable composition exhibiting high curability and having excellent offset printability when used for a printing ink, an active energy ray-curable printing ink having both excellent curability and offset printability, and a printed matter using the same.

Solution to Problem

As a result of repeated earnest investigations for solving the problem, the inventors found that an active energy ray-curable composition containing a urethane (meth)acrylate resin (A) used as a resin component in a printing ink varnish and a polymerization initiator (B) has significantly excellent curability and produces a printing ink having good offset printability, the urethane (meth)acrylate resin (A) being produced by using an aromatic polyisocyanate (a), a hydroxyl group-containing mono(meth)acrylate (b), and a polyol (c) as essential reaction raw materials and reacting the raw materials at a ratio such that the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a) is within a range of 0.99 to 0.40, leading to the achievement of the present invention.

That is, the present invention relates to an active energy ray-curable composition containing a urethane (meth)acrylate resin (A) and a polymerization initiator (B), the urethane (meth)acrylate resin (A) being produced by using an aromatic polyisocyanate (a), a hydroxyl group-containing mono(meth)acrylate (b), and a polyol (c) as essential reaction raw materials so that the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a) is within a range of 0.99 to 0.40, and the urethane (meth)acrylate resin (A) having a (meth)acryloyl group concentration within a range of 1.5 to 4.0 mmol/g.

Further, the present invention relates to an active energy ray-curable printing ink including the active energy ray-curable composition.

Further, the present invention relates to a printed matter produced by printing using the active energy ray-curable printing ink.

Advantageous Effects of Invention

According to the present invention, it is possible to provide an active energy ray-curable composition exhibiting high curability and having excellent offset printability when used for a printing ink, an active energy ray-curable printing ink having both excellent curability and offset printability, and a printed matter using the same.

DESCRIPTION OF EMBODIMENTS

A urethane (meth)acrylate resin (A) used in an active energy ray-curable resin composition of the present invention is characterized by three points: an aromatic polyisocyanate (a), a hydroxyl group-containing mono(meth)acrylate (b), and a polyol (c) are used as essential reaction raw materials, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a) is within a range of 0.99 to 0.40, and the (meth)acryloyl group concentration is within a range of 1.5 to 4.0 mmol/g.

In the present invention, the aromatic polyisocyanate is used as a raw material polyisocyanate, and thus a printing ink having good printability can be produced. Also, the aromatic polyisocyanate (a) is reacted with the hydroxyl group-containing mono(meth)acrylate (b) at a ratio such that the amount of the latter is relatively larger than the former, and then crosslinked with the polyol (c). In this case, the (meth)acryloyl group concentration can be increased and the molecular weight is relatively decreased, and thus both excellent curability and printability can be provided. When the ratio [(b')/(a')] exceeds 0.99, the hydroxyl group-containing mono(meth)acrylate (b) having high skin irritation easily remains in a printing ink, thereby causing the problem with safety and sanitary in handling the printing ink. Also, the molecular weight of the finally produced resin is not increased, thereby causing a decrease in curability and misting property. On the other hand, when the ratio [(b')/(a')] is less than 0.40, a large amount of isocyanate groups contributing to the crosslinking reaction in the second step remains, and thus gelation easily occurs during synthesis. In addition, if the resin can be synthesized, aromaticity in the finally produced urethane (meth)acrylate resin (A) is decreased, thereby decreasing offset printability.

Examples of the aromatic polyisocyanate (a) include diisocyanate compounds such as 2,4-tolylene diisocyanate, 2,6-tolylene diisocyanate, 1,3-xylylene diisocyanate, diphenylmethane-4,4-diisocyanate, 1,5-naphthalene diisocyanate, and the like; and polyfunctional polyisocyanate compounds each containing a component having three or more isocyanate groups per molecule, such as polymethylene polyphenyl polyisocyanate and adducts of the isocyanate compounds and a polyfunctional alcohol. These aromatic polyisocyanates (a) may be used alone or in combination of two or more. In the present invention, the polyisocyanate used as a raw material has an aromatic structure in its chemical structure, and thus excellent curability can be exhibited when a printing ink is produced by using the finally obtained urethane (meth)acrylate resin.

Among these aromatic polyisocyanates, a polyfunctional polyisocyanate compound containing a component (tri- or higher-functional component) having three or more isocyanate groups per molecule is particularly preferred because an UV-curable ink having more excellent curability can be designed. Specifically, a compound containing the tri- or higher-functional component at a ratio of 30% by mass or more is preferred. An example of the aromatic polyisocyanate containing the tri- or higher-functional component is polymethylene polyphenyl polyisocyanate, and polymethylene polyphenyl polyisocyanate having a viscosity of 100 to 700 mPa·s is more preferred. The viscosity is a value measured with an E-type viscometer (25° C.)

Examples of the hydroxyl group-containing (meth)acrylate (b) include hydroxyl group-containing (meth)acrylates such as hydroxyethyl (meth)acrylate, hydroxypropyl (meth)acrylate, hydroxybutyl acrylate, hydroxyethyl vinyl ether, and the like; ethylene oxide adducts of the hydroxyl group-containing (meth)acrylates, propylene oxide adducts, tetramethylene glycol adducts, lactone adducts of the hydroxyl group-containing (meth)acrylates, and the like. These hydroxyl group-containing mono(meth)acrylates (b) may be used alone or in combination of two or more. Among these, hydroxyethyl acrylate and hydroxypropyl acrylate are particularly preferred in view of excellent curability of the composition.

The polyol (c) is not particularly limited as long as it is a compound having a plurality of hydroxyl groups in its molecule, but an aliphatic polyhydric alcohol having a molecular weight within a range of 90 to 400 is preferred in view of curability and printability. Examples of the polyol (c) include bifunctional polyols such as neopentyl glycol, 1,3-butanediol, 1,4-butanediol, tripropylene glycol, and the like; trifunctional polyols such as glycerin, trimethylolpropane, and the like; tetrafunctional polyols such as pentaerythritol, ditrimethylolpropane, and the like; hexafunctional polyols such as dipentaerythritol and the like; ethylene oxide adducts (on average, addition of 1 to 4 moles per molecule) of the trifunctional polyols; propylene oxide adducts (on average, addition of 1 to 4 moles per molecule) of the trifunctional polyols; 1,3-butanediol adducts (on average, addition of 1 to 2 moles per molecule) of the trifunctional polyols; ethylene oxide adducts (on average, addition of 1 to 3 moles per molecule) of the tetrafunctional polyols; ethylene oxide adducts (on average, addition of 1 to 3 moles per molecule) of the hexafunctional polyols; and the like. These may be used alone or in combination or two or more. Among these, the trifunctional polyols such as glycerin, trimethylolpropane, and the like, neopentyl glycol, 1,6-hexanediol, and tripropylene glycol are preferred from the viewpoint that the urethane (meth)acrylate resin (A) having a proper branched structure can be produced, and excellent offset printability and curability can be exhibited. In particular, the trifunctional polyols such as glycerin, trimethylolpropane, and the like are particularly preferred in view of excellent misting property and curability.

A method for producing the urethane (meth)acrylate resin (A) is not particularly limited, and examples thereof include a method of reacting the aromatic polyisocyanate (a), the hydroxyl group-containing mono(meth)acrylate (b), and the polyol (c) as the essential reaction raw materials all at once, a method of reacting the aromatic polyisocyanate (a) with the hydroxyl group-containing mono(meth)acrylate (b) and then reacting the polyol (c), and a method of reacting the aromatic polyisocyanate (a), the hydroxyl group-containing mono(meth)acrylate (b), and a portion of the polyol (c) and then adding and reacting the residue of the polyol (c). In particular, the method of reacting the aromatic polyisocyanate (a) with the hydroxyl group-containing mono(meth)acrylate (b) and then reacting the polyol (c) is preferred because the molecular weight of the urethane (meth)acrylate resin (A) can be easily controlled, and gelation or the like hardly occurs.

A method for reacting the polyfunctional aromatic isocyanate (a) with the hydroxyl group-containing mono(meth)acrylate (b) is, for example, a method of adding the polyfunctional aromatic isocyanate (a) and, if required, a known common urethanization catalyst, heating the resultant mixture to 20° C. to 120° C., and then adding and reacting a predetermined amount of the hydroxyl group-containing mono(meth)acrylate (b) continuously or intermittently in the reaction system.

Next, the intended urethane (meth)acrylate resin (A) can be obtained by reacting the resultant reaction product with the polyol (c) in a second step.

The reaction ratio of the polyol (c) is preferably 1% to 15% by mass relative to the total mass of the component (a) to the component (c) from the viewpoint of increasing the (meth)acryloyl group concentration in the finally produced urethane (meth)acrylate resin (A) and significantly improving curability and printability.

Specifically, the reaction method in the second step is, for example, a method of adding the polyol (c) to the reaction product produced in the first step, heating the resultant mixture to 20° C. to 120° C., and then performing reaction until an infrared absorption spectrum at 2250 cm$^{-1}$ which indicates an isocyanate group disappears.

The urethane (meth)acrylate resin (A) produced as described above is a urethane (meth)acrylate resin having a structure in which the reaction products of the aromatic polyisocyanate (a) and the hydroxyl group-containing mono (meth)acrylate (b) are linked through the polyol (c) and having a high concentration of (meth)acryloyl group. Specifically, the urethane (meth)acrylate resin (A) is characterized by having a (meth)acryloyl group concentration within a range of 1.5 to 4.0 mmol/g. When the (meth)acryloyl group concentration is less than 1.5 mmol/g, excellent curability cannot be achieved. While when the (meth)acryloyl group concentration exceeds 4.0 mmol/g, the misting performance of a printing ink is decreased due to the excessively high flowability of the urethane (meth)acrylate resin (A) and the risk of leaving the hydroxyl group-containing mono(meth) acrylate (b) in the printing ink is increased.

The urethane (meth)acrylate resin (A) produced as described above preferably has a weight-average molecular weight (Mw) within a range of 3,000 to 40,000 from the viewpoint of producing a printing ink having excellent flowability, misting property, and printability.

In the present invention, the weight-average molecular weight (Mw) is a value measured by gel permeation chromatography (GPC) under conditions described below.

Measurement apparatus: HLC-8220GPC manufactured by Tosoh Corporation

Column: TSK-GUARDCOLUMN Super HZ-L manufactured by Tosoh Corporation

+TSK-GEL Super HZM-MX4 manufactured by Tosoh Corporation

Detector: RI (differential refractometer)

Data processing: multi-station GPC-8020 model III manufactured by Tosoh Corporation Measurement condition:

Column temperature: 40° C.

Solvent: tetrahydrofuran

Flow rate: 0.35 ml/min

Standard: monodisperse polystyrene

Sample: prepared by filtering a 0.2 mass % tetrahydrofuran solution in terms of resin solid content with a microfilter (100 µl).

Examples of the polymerization initiator (B) used in the active energy ray-curable composition of the present invention include an intramolecular cleavage-type photopolymerization initiator and a hydrogen abstraction-type photopolymerization initiator. Examples of the intramolecular cleavage-type photopolymerization initiator include acetophenone-based compounds such as diethoxyacetophenone, 2-hydroxy-2-methyl-1-phenylpropan-1-one, benzyldimethyl ketal, 1-(4-isopropylphenyl)-2-hydroxy-2-methylpropan-1-one, 4-(2-hydroxyethoxy)phenyl-2-hydroxy-2-propyl) ketone, 1-hydroxycyclohexyl-phenyl ketone, 2-hydroxy-1-{4-[4-(2-hydroxy-2-methyl-propionyl)-benzyl]-phenyl}-2-methyl-propan-1-one, 2,2-dimethoxy-1,2-diphenylethan-1-one, 2,2-diethoxy-1,2-diphenylethan-1-one, and the like; oxime-based compounds such as 1-[4-(phenylthio)-2-(O-benzoyloxime)], 1-[9-ethyl-6-(2-methylbenzoyl)-9H-carbazol-3-yl]-1-(O-acetyloxime), and the like; carbazole-based compounds such as 3,6-bis(2-methyl-2-morpholinopropanonyl)-9-butylcarbazole, and the like; benzoin-based compounds such as benzoin, benzoin methyl ether, benzoin isopropyl ether, and the like;

aminoalkylphenone-based compounds such as 2-benzyl-2-dimethylamino-1-(4-morpholinophenyl)butan-1-one, 2-(dimethylamino)-2-(4-methylbenzyl)-1-(4-morpholinophenyl)butan-1-one, 2-methyl-2-morpholino((4-methylthio)phenyl)propan-1-one, 2-benzyl-2-dimethylamino-1-(4-morpholinophenyl)-butanone, and the like; acylphosphine oxide-based compounds such as bis(2,4,6-trimethylbenzoyl)-phenylphosphine oxide, 2,4,6-trimethylbenzoyl diphenylphosphine oxide, bis(2,6-dimethoxybenzoyl)-2,4, 4-trimethyl-pentylphosphine oxide, and the like; benzyl; methylphenyl glyoxyl ester; and the like.

On the other hand, examples of the hydrogen abstraction-type photopolymerization initiator include benzophenone-based compounds such as benzophenone, methyl o-benzoylbenzoate-4-phenylbenzophenone, 4,4'-dichlorobenzophenone, hydroxybenzophenone, 4-benzoyl-4'-methyl-diphenyl sulfide, acrylated benzophenone, 3,3',4, 4'-tetra(tert-butylperoxycarbonyl)benzophenone, 3,3'-dimethyl-4-methoxybenzophenone, and the like; thioxathone-based compounds such as 2-isopropylthioxanthone, 2,4-dimethylthioxanthone, 2,4-diethylthioxanthone, 2,4-dichlorothioxanthone, and the like; aminobenzophenone-based compounds such as 4,4'-bisdimethylaminobenzophenone, 4,4'-bisdiethylaminobenzophenone, and the like; other compounds such as 10-butyl-2-chloroacridone, 2-ethylanthraquinone, 9,10-phenanthrenequinone, camphor quinone, and the like. These photopolymerization initiators can be used alone or in combination of two or more. Among these, the aminoalkylphenone-based compounds are particularly preferred in view of excellent curability. Also, particularly when an UV-LED light source generating ultraviolet light having an emission peak wavelength within a range of 350 to 420 nm is used as an active energy ray source, the aminoalkylphenone-based compound, acylphosphine oxide-based compound, and aminobenzophenone-based compound are preferably used in combination in view of excellent curability.

The total amount of the polymerization initiator (B) used is preferably is within a range of 1 to 20 parts by mass relative to 100 parts by mass of nonvolatile components in the active energy ray-curable composition of the present invention. That is, when the total amount of the polymerization initiator (B) used is 1 part by mass or more, good curability can be obtained, while when the total amount is 20 parts by mass or less, it is possible to avoid migration due to the unreacted polymerization initiator (B) remaining in a cured product and a decrease in physical properties of a cured product, such as hardness and the like. In particular, in view of better balance between these performances, the total amount of use is more preferably within a range of 3 to 15 parts by mass relative to 100 parts by mass of nonvolatile components in the active energy ray-curable composition of the present invention.

When a cured film such as a printed matter, a coating film, or the like is formed by irradiation with ultraviolet rays used as active energy rays, curability can be further improved by using a photosensitizer in addition to the polymerization initiator (B). Examples of the photosensitizer include amine compounds such as aliphatic amine and the like; ureas such as o-tolylthiourea and the like; sulfur compounds such as sodium diethyldithiophosphate, s-benzylisothiouronium-p-toluenesufonate, and the like. The total amount of the photosensitizer used is preferably within a range of 1 to 20 parts by mass relative to 100 parts by mass of nonvolatile components in the active energy ray-curable composition of the present invention in view of the good effect of improving curability.

The active energy ray-curable composition of the present invention contains the polymerizable unsaturated group-containing resin (A) and the polymerization initiator (B) detailed above as essential components, but can further contain a polymerizable diluent (C) according to application.

Examples of the polymerizable diluent (C) used include monofunctional polymerizable monomers such as N-vinylcaprolactam, N-vinylpyrrolidone, N-vinylcarbazole, vinylpyridine, N,N-dimethyl(meth)acrylamide, acrylamide, acryloylmorpholine, 7-amino-3,7-dimethyloctyl (meth)acrylate, isobutoxy methyl(meth)acrylamide, tert-octyl (meth)acrylamide, diacetone (meth)acrylamide, dimethylaminoethyl (meth)acrylate, diethylaminoethyl (meth)acrylate, 2-ethylhexyl (meth)acrylate, ethyldiethylene glycol (meth)acrylate, lauryl (meth)acrylate, dicyclopentadienyl (meth)acrylate, dicyclopentenyloxyethyl (meth)acrylate, dicyclopentenyl meth)acrylate, tetachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, phenoxyethyl (meth)acrylate, butoxyethyl (meth)acrylate, pentachlorophenyl (meth)acrylate, pentabromophenyl (meth)acrylate, bornyl (meth)acrylate, methyltriethylene diglycol (meth)acrylate, isobornyl (meth)acrylate, bisphenol A mono(meth)acrylate, bisphenol F mono(meth)acrylate, alkylene oxide-added bisphenol F mono(meth)acrylate, mono{2-(meth)acryloyloxyethyl} acid phosphate, vinylsulphonic acid, allylsulphonic acid, 2-methylallylsulphonic acid, 4-vinylbenzenesulphonic acid, 2-(meth)acryloyloxyethanesulphonic acid, 3-(meth)acryloyloxypropanesulphonic acid, 2-acrylamide-2-methylpropanesulphonic acid, and the like; polysiloxane bond-containing monomers such as $CH_2=CHCOO(CH_2)_3[Si(CH_3)_2O]_nSi(CH_3)_3$, $CH_2=C(CH_3)COOC_6H_4[Si(CH_3)_2O]_nSi(CH_3)_3$, $CH_2=C(CH_3)COO(CH_2)_3[Si(CH_3)_2O]_nSi(CH_3)_3$, $CH_2=C(CH_3)COO(CH_2)_3[Si(CH_3)(C_6H_5)O]_nSi(CH_3)_3$, $CH_2=C(CH_3)COO(CH_2)_3[Si(C_6H_5)_2O]_nSi(CH_3)_3$ (in each of the formulae, n is 0 or an integer of 1 to 130), and the like; γ-(meth)acryloxypropyl trimethoxysilane, γ-(meth)acryloxypropyl triethoxysilane, γ-(meth)acryloxypropylmethyl dimethoxysilane, γ-(meth)acryloxypropylmethyl diethoxysilane, γ-(meth)acryloyloxypropyl triisopropenyloxysilane, vinyl trimethoxysilane, vinyl triethoxysilane, vinyl(tris-β-methoxyethoxy)silane, vinyl triacetoxysilane, vinyl trichlorosilane, N-β-(N-vinylbenzylaminoethyl)-γ-aminopropyl trimethoxysilane, and hydrochlorides thereof; various vinyl ethers having tertiary amine, such as 2-dimethylaminoethyl vinyl ether, 2-diethylaminoethyl vinyl ether, 4-dimethylaminobutyl vinyl ether, 4-diethylaminobutyl vinyl ether, 6-dimethylaminohexyl vinyl ether, and the like; vinyl ethers such as methyl vinyl ether, ethyl vinyl ether, n-propyl vinyl ether, n-butyl vinyl ether, iso-butyl vinyl ether, 2-ethylhexyl vinyl ether, cyclopentyl vinyl ether, cyclohexyl vinyl ether, and the like; ethylene glycol di(meth)acrylate, dicyclopentenyl di(meth)acrylate, triethylene glycol di(meth)acrylate, tetraethylene glycol di(meth)acrylate, tricyclodecane di(meth)acrylate, dimethyloltricyclodecane diacrylate, tripropylene glycol di(meth)acrylate, 1,4-butanediol di(meth)acrylate, 1,6-hexanediol di(meth)acrylate, polyethylene glycol di(meth)acrylate, polypropylene glycol di(meth)acrylate, neopentyl glycol di(meth)acrylate, di(meth)acrylate of hydroxypivalic acid neopentyl glycol ester, di(meth)acrylate of bisphenol A or bisphenol F, alkylene oxide-added bisphenol poly(meth)acrylate which is the reaction product of (meth)acrylic acid and a compound produced by adding alkylene oxide to bisphenol such as bisphenol A, bisphenol F, or the like; difunctional monomers such as various divalent carboxylic acid divinyl esters of various unsaturated dibasic acids such as maleic acid, fumaric acid, itaconic acid, citraconic acid, and the like; aliphatic polyhydric alcohol poly(meth)acrylates such as trimethylolpropane tri(meth)acrylate, pentaerythritol tetra(meth)acrylate, dipentaerythritol hexa(meth)acrylate, and the like; alkylene oxide-added aliphatic polyhydric alcohol poly(meth)acrylates, such as ethylene oxide-added trimethylolpropane tri(meth)acrylate, ethylene oxide-added pentaerythritol tetra(meth)acrylate, ethylene oxide-added dipentaerythritol hexa(meth)acrylate, propylene oxide-added trimethylolpropane tri(meth)acrylate, propylene oxide-added pentaerythritol tetra(meth)acrylate, propylene oxide-added dipentaerythritol hexa(meth)acrylate, and the like; ε-caprolactone-added aliphatic polyhydric alcohol poly(meth)acrylates such as ε-caprolactone-added trimethylolpropane tri(meth)acrylate, ε-caprolactone-added pentaerythritol tetra(meth)acrylate, ε-caprolactone-added dipentaerythritol hexa(meth)acrylate, and the like.

Among these, the aliphatic polyhydric alcohol poly(meth)acrylates are preferred in view of particularly excellent curability as a printing ink, and the alkylene oxide-added aliphatic polyhydric alcohol poly(meth)acrylates are preferred in view of excellent offset printability. In the latter alkylene oxide-added aliphatic polyhydric alcohol poly(meth)acrylates, the average number of alkylene oxide added per molecule of the acrylate is preferably within a range of 2 to 4.

Further, the alkylene oxide-added aliphatic polyhydric alcohol poly(meth)acrylate is preferably used in combination with the alkylene oxide-added bisphenol poly(meth)acrylate in view of higher curability and good printability. In the alkylene oxide-added bisphenol poly(meth)acrylates, the average number of alkylene oxide added per molecule of the acrylate is preferably within a range of 2 to 4, and the presence ratio between the alkylene oxide-added aliphatic polyhydric alcohol poly(meth)acrylate and the alkylene oxide-added bisphenol poly(meth)acrylate is preferably such that the former/latter ratio is 90/10 to 50/50 on a mass basis.

When the active energy ray-curable composition of the present invention is used for an active energy ray-curable printing ink, the components (A) to (C) may be simultaneously mixed together with other mixing components or the polymerizable diluent (C) may be previously added to the urethane (meth)acrylate resin (A) to prepare a resin-solution composition which may be used for preparing the printing ink. In this case, in view of the ease of subsequent preparation of the printing ink and offset printability, the resin-solution composition preferably has a viscosity within a range of 0.5 to 10.0 Pa·s which is measured with an E-type viscometer (25° C.) in a state in which a nonvolatile content is adjusted to 80% by mass by further adding butyl acetate to the composition containing the urethane (meth)acrylate resin (A) and the polymerizable diluent (C).

In addition, the components for preparing the active energy ray-curable printing ink can be mixed in the printing ink, for example, at a ratio such that the urethane (meth)acrylate resin (A) is 40% by mass, the polymerization initiator (B) is 2 to 10% by mass, the polymerizable diluent (C) is 30 to 65% by mass, a pigment is 10 to 30% by mass, and the total of other components is 0.5 to 10% by mass.

Also, when used for the active energy ray-curable printing ink, besides the components (A) to (C) described above, additives such as a pigment, a dye, an extender pigment, an organic or inorganic filler, an organic solvent, an antistatic agent, a defoaming agent, a viscosity modifier, a light stabilizer, a weathering stabilizer, a heat stabilizer, an ultraviolet absorber, an antioxidant, a leveling agent, a pigment dispersant, a wax, etc. can be used.

A method for producing the active energy ray-curable printing ink of the present invention is, for example, a method of mixing and stirring the components by using a mixer or the like and then kneading the resultant mixture by using a disperser such as a three-roll mill, a beads mill, or the like.

A cured coating film can be formed by printing the active energy ray-curable composition, further the active energy ray-curable printing ink, on a substrate and then irradiation with active energy rays. Examples of the active energy rays include ionizing radiations such as ultraviolet light, electron beams, α-rays, β-rays, γ-rays, and the like. Among these, ultraviolet light is preferred in view of curability.

As described above, examples of the active energy rays for curing the active energy ray-curable coating material of the present invention include ionizing radiations such as ultraviolet light, electron beams, α-rays, β-rays, and γ-rays. Specifically, usable is ultraviolet light emitted from a light source such as an energy source or curing device, for example, a sterilization lamp, an ultraviolet fluorescent lamp, an UV-LED, a carbon arc, a xenon lamp, a high-pressure mercury lamp for copying, a medium-pressure or high-pressure mercury lamp, a super-high-pressure mercury lamp, an electroless lamp, a metal halide lamp, natural light, or the like, or electron beams from a scanning or curtain-type electron accelerator.

The pigment used for the active energy ray-curable printing ink of the present invention is, for example, a known common organic pigment for coloring, and examples thereof include organic pigments for printing inks described in "Organic Pigment Handbook (author: Isao Hashimoto, publishing office: Color Office, First Edition, 2006)". Usable examples thereof include a soluble azo pigment, an insoluble azo pigment, a condensed azo pigment, a metal phthalocyanine pigment, a non-metal phthalocyanine pigment, a quinacridone pigment, a perylene pigment, a perinone pigment, an isoindolinone pigment, an isoindoline pigment, a dioxazine pigment, a thioindigo pigment, an anthraquinone pigment, a quinophthalone pigment, a metal complex pigment, a diketopyrrolopyrrole pigment, a carbon black pigment, other polycyclic pigments, and the like.

In addition, inorganic fine particles may be used as an extender pigment in the active energy ray-curable printing ink of the present invention. Examples of the inorganic fine particles include inorganic pigments: inorganic color pigments such as titanium oxide, graphite, zinc flower, and the like; inorganic extender pigments such as calcium carbonate, precipitated calcium carbonate, gypsum, clay (China Clay), silica powder, diatomaceous earth, talc, kaolin, alumina white, barium sulfate, aluminum stearate, magnesium carbonate, barite powder, polishing powder, and the like; silicone; glass beads; and the like. Using the inorganic fine particles within a range of 0.1 to 20 parts by mass in the ink can cause the effect of adjusting ink flowability, preventing misting, and preventing permeation into a printing substrate such as paper or the like.

Examples of a printing substrate suitable for the active energy ray-curable printing ink of the present invention include paper substrates used for a catalog, a poster, a leaflet, a CD jacket, a direct mail, a pamphlet, a packages for cosmetic and drink, a medicine, a toy, a device, and the like; films used for various food packaging materials, such as a polypropylene film, a polyethylene terephthalate (PET) film, and the like, an aluminum foil, synthetic paper, and other various substrates generally used as printing substrates.

In addition, examples of a method for printing the active energy ray-curable printing ink of the present invention include lithographic offset printing, relief printing, gravure printing, gravure offset printing, flexographic printing, screen printing, and the like.

In view of improvement in emulsification properties of an ink, the present invention can be particularly preferably used for lithographic offset printing in which water is continuously supplied to a plate surface. Offset printing machines in which water is continuously supplied are manufactured and sold by many printing machine makers, and examples of the makers include Heidelberg Co., Ltd., Komori Corporation, Ryobi MHI Graphic Technology Ltd., Manroland Co., Ltd., KBA Inc., and the like. Also, the present invention can be preferably used in any one of the paper feed systems of a sheet offset printing machine using sheet-form printing paper and a rotary offset printing machine using reel-form printing paper. More specific examples of the offset printing machines include Speedmaster Series manufactured by Heidelberg Co., Ltd., Lithrone Series manufactured by Komori Corporation, Diamond Series manufactured by Ryobi MHI Graphic Technology Ltd., and the like.

EXAMPLES

The present invention is described in further detail below by giving examples. The present invention is not limited to these examples.

(Measurement Condition for Infrared Absorption Spectrum)

[Apparatus type] FT/IR-4100 manufactured by JASCO Corporation

[Measurement condition] The completion of reaction was confirmed by confirming an infrared absorption spectrum at 2250 $cm^{-1}$ showing an isocyanate group.

(Measurement Condition for Weight-Average Molecular Weight (Mw))

The weight-average molecular weight (Mw) is a value measured by gel permeation chromatography (GPC) under conditions described below.

Measurement apparatus: HLC-8220GPC manufactured by Tosoh Corporation

Column: TSK-GUARDCOLUMN Super HZ-L manufactured by Tosoh Corporation
+TSK-GEL Super HZM-MX4 manufactured by Tosoh Corporation
Detector: RI (differential refractometer)
Data processing: multi-station GPC-8020 model III manufactured by Tosoh Corporation
Measurement condition:
Column temperature: 40° C.
Solvent: tetrahydrofuran
Flow rate: 0.35 ml/min
Standard: monodisperse polystyrene
Sample: prepared by filtering a 0.2 mass % tetrahydrofuran solution in terms of resin solid content with a microfilter (100 μl).

Production Example 1

In a four-neck flask provided with a stirrer, a gas inlet tube, a condenser, and a thermometer, in a first step, 57.6 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 38.7 parts by mass of 2-hydroxyethyl acrylate was added dropwisely to the resultant mixture over 1 hour under stirring. After reaction at 75° C. for 3 hours after the addition, in a second step, 3.7 parts by mass of trimethylolpropane was added and further reacted at 75° C., and the reaction was performed until an infrared absorption spectrum at 2250 cm$^{-1}$ showing an isocyanate group disappeared, thereby producing a urethane acrylate resin.
The resin was used as a urethane acrylate resin (A1). Table 1 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A1).

Production Example 2

In a four-neck flask provided with a stirrer, a gas inlet tube, a condenser, and a thermometer, in a first step, 58.9 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 35.8 parts by mass of 2-hydroxyethyl acrylate was added dropwisely to the resultant mixture over 1 hour under stirring. After reaction at 75° C. for 3 hours after the addition, in a second step, 5.3 parts by mass of trimethylolpropane was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A2).
Table 1 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A1).

Production Example 3

In a four-neck flask provided with a stirrer, a gas inlet tube, a condenser, and a thermometer, in a first step, 60.3 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 33.4 parts by mass of 2-hydroxyethyl acrylate was added dropwisely to the resultant mixture over 1 hour under stirring. After reaction at 75° C. for 3 hours after the addition, in a second step, 6.4 parts by mass of trimethylolpropane was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A3). The amount of 2-hydroxyethyl acrylate remaining in the urethane acrylate resin (A3) was 100 ppm or less.
Table 1 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A1).

Production Example 4

In a four-neck flask provided with a stirrer, a gas inlet tube, a condenser, and a thermometer, in a first step, 57.4 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 40.9 parts by mass of 2-hydroxyethyl acrylate was added dropwisely to the resultant mixture over 1 hour under stirring. After reaction at 75° C. for 3 hours after the addition, in a second step, 1.8 parts by mass of glycerin was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A4).
Table 1 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A1).

Production Example 5

In a four-neck flask provided with a stirrer, a gas inlet tube, a condenser, and a thermometer, in a first step, 61.5 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 33.8 parts by mass of 2-hydroxyethyl acrylate was added dropwisely to the resultant mixture over 1 hour under stirring. After reaction at 75° C. for 3 hours after the addition, in a second step, 6.5 parts by mass of glycerin was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A5).

Table 1 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A1).

Production Example 6

In a four-neck flask provided with a stirrer, a gas inlet tube, a condenser, and a thermometer, in a first step, 59.4 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 37.3 parts by mass of 2-hydroxyethyl acrylate was added dropwisely to the resultant mixture over 1 hour under stirring. After reaction at 75° C. for 3 hours after the addition, in a second step, 3.3 parts by mass of glycerin was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A6). Table 1 shows a raw material composition, the ratio [(b')/(a')] of the number of moles (b') of hydroxyl groups contained in the hydroxyl group-containing mono (meth)acrylate (b) to the number of moles (a') of isocyanate groups contained in the aromatic polyisocyanate (a), and the acryloyl group concentration and weight-average molecular weight of the resultant urethane acrylate resin (A1).

Production Example 7

In a four-neck flask provided with a stirrer, a gas inlet tube, a condenser, and a thermometer, in a first step, 60.3 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 35.7 parts by mass of 2-hydroxyethyl acrylate was added dropwisely to the resultant mixture over 1 hour under stirring. After reaction at 75° C. for 3 hours after the addition, in a second step, 4.0 parts by mass of glycerin was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A7).

Table 1 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A7).

Production Example 8

In a four-neck flask provided with a stirrer, a gas inlet tube, a condenser, and a thermometer, in a first step, 57.4 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 40.9 parts by mass of 2-hydroxyethyl acrylate was added dropwisely to the resultant mixture over 1 hour under stirring. After reaction at 75° C. for 3 hours after the addition, in a second step, 4.0 parts by mass of neopentylglycol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A8).

Table 1 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A8).

Production Example 9

In a four-neck flask provided with a stirrer, a gas inlet tube, a condenser, and a thermometer, in a first step, 61.6 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 28.2 parts by mass of 2-hydroxyethyl acrylate was added dropwisely to the resultant mixture over 1 hour under stirring. After reaction at 75° C. for 3 hours after the addition, in a second step, 10.2 parts by mass of neopentylglycol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A9).

Table 1 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A9).

TABLE 1

| | | | Resin No. | Production Example 1 A-1 | Production Example 2 A-2 | Production Example 3 A-3 | Production Example 4 A-4 | Production Example 5 A-5 |
|---|---|---|---|---|---|---|---|---|
| Reaction condition for producing urethane acrylate resin | First step | Polyfunctional aromatic isocyanate (a) | MR400 MR200 MR100 TDI IPDI N3300 | 57.6 | 58.9 | 60.3 | 57.4 | 61.5 |
| | | Hydroxyl group-containing mono(meth)acrylate (b) | HEA | 38.7 | 35.8 | 33.4 | 40.9 | 33.8 |
| | (b')/(a') Ratio [equivalent ratio] | | | 0.81 | 0.73 | 0.67 | 0.86 | 0.66 |
| | Second step | Polyfunctional polyol (c) | TMP GLY NPG TPG 1.6-HG PPG PTMG | 3.7 | 5.3 | 6.4 | 1.8 | 6.5 |
| Property value of urethane acrylate resin | Acryloyl group concentration [mmol/g] | | | 3.34 | 3.09 | 2.88 | 3.52 | 2.92 |
| | Weight-average molecular weight [Mw] | | | 4884 | 10263 | 17198 | 3041 | 25958 |

| | | | Resin No. | Production Example 6 A-6 | Production Example 7 A-7 | Production Example 8 A-8 | Production Example 9 A-9 |
|---|---|---|---|---|---|---|---|
| Reaction condition for producing urethane acrylate resin | First step | Polyfunctional aromatic isocyanate (a) | MR400 MR200 MR100 TDI IPDI N3300 | 59.4 | 60.3 | 57.4 | 61.6 |
| | | Hydroxyl group-containing mono(meth)acrylate (b) | HEA | 37.3 | 35.7 | 40.9 | 28.2 |
| | (b')/(a') Ratio [equivalent ratio] | | | 0.76 | 0.71 | 0.81 | 0.55 |
| | Second step | Polyfunctional polyol (c) | TMP GLY NPG TPG 1.6-HG PPG PTMG | 3.3 | 4.0 | 4.0 | 10.2 |
| Property value of urethane acrylate resin | Acryloyl group concentration [mmol/g] | | | 3.22 | 3.08 | 3.33 | 2.43 |
| | Weight-average molecular weight [Mw] | | | 5438 | 9610 | 3079 | 11931 |

Production Example 10

In a four-neck flask provided with a stirrer, a gas inlet tube, a condenser, and a thermometer, in a first step, 55.8 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 33.4 parts by mass of 2-hydroxyethyl acrylate was added dropwisely to the resultant mixture over 1 hour under stirring. After reaction at 75° C. for 3 hours after the addition, in a second step, 10.8 parts by mass of tripropylene glycol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A10).

Table 2 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A10).

Production Example 11

In a four-neck flask provided with a stirrer, a gas inlet tube, a condenser, and a thermometer, in a first step, 56.4 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 27.0 parts by mass of 2-hydroxyethyl acrylate was added dropwisely to the resultant mixture over 1 hour under stirring. After reaction at 75° C. for 3 hours after the addition, in a second step, 16.6 parts by mass of tripropylene glycol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A11).

Table 1 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A11).

Production Example 12

In a four-neck flask provided with a stirrer, a gas inlet tube, a condenser, and a thermometer, in a first step, 58.3 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 34.8 parts by mass of 2-hydroxyethyl acrylate was added dropwisely to the resultant mixture over 1 hour under stirring. After reaction at 75° C. for 3 hours after the addition, in a second step, 6.9 parts by mass of 1,6-hexanediol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A12).

Table 2 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A12).

Production Example 13

In a four-neck flask provided with a stirrer, a gas inlet tube, a condenser, and a thermometer, in a first step, 63.0 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 24.7 parts by mass of 2-hydroxyethyl acrylate was added dropwisely to the resultant mixture over 1 hour under stirring. After reaction at 75° C. for 3 hours after the addition, in a second step, 12.3 parts by mass of neopentylglycol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A13). Table 2 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A13).

Production Example 14

In a four-neck flask provided with a stirrer, a gas inlet tube, a condenser, and a thermometer, in a first step, 63.6 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 23.0 parts by mass of 2-hydroxyethyl acrylate was added dropwisely to the resultant mixture over 1 hour under stirring. After reaction at 75° C. for 3 hours after the addition, in a second step, 13.4 parts by mass of neopentylglycol was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A14).

Table 2 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A14).

Production Example 15

In a four-neck flask provided with a stirrer, a gas inlet tube, a condenser, and a thermometer, in a first step, 57.1 parts by mass of polymethylene polyphenyl polyisocyanate ("Millionate MR-200" manufactured by Nippon Polyurethane Industry Co., Ltd., 35.2% by mass binuclear component, 64.8% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 39.1 parts by mass of 2-hydroxyethyl acrylate was added dropwisely to the resultant mixture over 1 hour under stirring. After reaction at 75° C. for 3 hours after the addition, in a second step, 3.8 parts by mass of trimethylolpropane was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A15).

Table 2 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (A15).

Production Example 16

In a four-neck flask provided with a stirrer, a gas inlet tube, a condenser, and a thermometer, in a first step, 58.8 parts by mass of polymethylene polyphenyl polyisocyanate ("Millionate MR-200" manufactured by Nippon Polyurethane Industry Co., Ltd., 35.2% by mass binuclear component, 64.8% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 37.8 parts by mass of 2-hydroxyethyl acrylate was added dropwisely to the resultant mixture over 1 hour under stirring. After reaction at 75° C. for 3 hours after the addition, in a second step, 3.3 parts by mass of glycerin was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A16). Table 2 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A16).

Production Example 17

In a four-neck flask provided with a stirrer, a gas inlet tube, a condenser, and a thermometer, in a first step, 59.8 parts by mass of polymethylene polyphenyl polyisocyanate ("Millionate MR-200" manufactured by Nippon Polyurethane Industry Co., Ltd., 35.2% by mass binuclear component, 64.8% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 36.2 parts by mass of 2-hydroxyethyl acrylate was added dropwisely to the resultant mixture over 1 hour under stirring. After reaction at 75° C. for 3 hours after the addition, in a second step, 4.0 parts by mass of glycerin was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (A17). Table 2 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (A17).

TABLE 2

|  |  |  |  | Production Example 10 | Production Example 11 | Production Example 12 | Production Example 13 |
|---|---|---|---|---|---|---|---|
|  |  |  | Resin No. | A-10 | A-11 | A-12 | A-13 |
| Reaction condition for producing urethane acrylate resin | First step | Polyfunctional aromatic isocyanate (a) | MR400 | 55.8 | 56.4 | 58.3 | 63.0 |
|  |  |  | MR200 |  |  |  |  |
|  |  |  | MR100 |  |  |  |  |
|  |  |  | TDI |  |  |  |  |
|  |  |  | IPDI |  |  |  |  |
|  |  |  | N3300 |  |  |  |  |
|  |  | Hydroxyl group-containing mono(meth)acrylate (b) | HEA | 33.4 | 27.0 | 34.8 | 24.7 |
|  | (b')/(a') Ratio [equivalent ratio] |  |  | 0.72 | 0.57 | 0.72 | 0.47 |
|  | Second step | Polyfunctional polyol (c) | TMP |  |  |  |  |
|  |  |  | GLY |  |  |  |  |
|  |  |  | NPG |  |  |  | 12.3 |
|  |  |  | TPG | 10.8 | 16.6 |  |  |
|  |  |  | 1,6-HG |  |  | 6.9 |  |
|  |  |  | PPG |  |  |  |  |
|  |  |  | PTMG |  |  |  |  |
| Property value of urethane acrylate resin | Acryloyl group concentration [mmol/g] |  |  | 2.88 | 2.32 | 2.99 | 2.13 |
|  | Weight-average molecular weight [Mw] |  |  | 3162 | 6601 | 3773 | 22181 |

|  |  |  |  | Production Example 14 | Production Example 15 | Production Example 16 | Production Example 17 |
|---|---|---|---|---|---|---|---|
|  |  |  | Resin No. | A-14 | A-15 | A-16 | A-17 |
| Reaction condition for producing urethane acrylate resin | First step | Polyfunctional aromatic isocyanate (a) | MR400 | 63.6 |  |  |  |
|  |  |  | MR200 |  | 57.1 | 58.8 | 59.8 |
|  |  |  | MR100 |  |  |  |  |
|  |  |  | TDI |  |  |  |  |
|  |  |  | IPDI |  |  |  |  |
|  |  |  | N3300 |  |  |  |  |
|  |  | Hydroxyl group-containing mono(meth)acrylate (b) | HEA | 23.0 | 39.1 | 37.8 | 36.2 |
|  | (b')/(a') Ratio [equivalent ratio] |  |  | 0.43 | 0.80 | 0.75 | 0.70 |
|  | Second step | Polyfunctional polyol (c) | TMP |  | 3.8 |  |  |
|  |  |  | GLY |  |  | 3.3 | 4.0 |
|  |  |  | NPG | 13.4 |  |  |  |
|  |  |  | TPG |  |  |  |  |
|  |  |  | 1,6-HG |  |  |  |  |
|  |  |  | PPG |  |  |  |  |
|  |  |  | PTMG |  |  |  |  |
| Property value of urethane acrylate resin | Acryloyl group concentration [mmol/g] |  |  | 1.98 | 3.37 | 3.26 | 3.11 |
|  | Weight-average molecular weight [Mw] |  |  | 36575 | 2449 | 3574 | 6112 |

Comparative Production Example 1

In a four-neck flask provided with a stirrer, a gas inlet tube, a condenser, and a thermometer, in a first step, 54.6 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 45.4 parts by mass of 2-hydroxyethyl acrylate was added dropwisely to the resultant mixture over 1 hour under stirring. After the addition, reaction was performed at 75° C. until an infrared absorption spectrum at 2250 cm$^{-1}$ showing an isocyanate group disappeared, thereby producing a urethane acrylate resin. The resin was used as a urethane acrylate resin (B1). The amount of 2-hydroxyethyl acrylate remaining in the urethane acrylate resin (B1) was 5350 ppm.

Table 3 shows a raw material composition, the ratio [(b')/(a')] of the number of moles (b') of hydroxyl groups contained in the hydroxyl group-containing mono(meth)acrylate (b) to the number of moles (a') of isocyanate groups contained in the aromatic polyisocyanate (a), and the acryloyl group concentration and weight-average molecular weight of the resultant urethane acrylate resin (B1).

Comparative Production Example 2

In a four-neck flask provided with a stirrer, a gas inlet tube, a condenser, and a thermometer, in a first step, 71.2 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 17.8 parts by mass of 2-hydroxyethyl acrylate was added dropwisely to the resultant mixture over 1 hour under stirring. After reaction at 75° C. for 3 hours after the addition, in a second step, 11.0 parts by mass of glycerin was added and further reacted at 75° C. As a result, gelation occurred.

Comparative Production Example 3

In a four-neck flask provided with a stirrer, a gas inlet tube, a condenser, and a thermometer, 69.7 parts by mass of hexamethylene diisocyanate-based isocyanurate-type polyisocyanate ("Sumidur N3300" manufactured by Sumitomo Bayer Urethane Co., Ltd.), 0.1 parts by mass of tertiary-butyl hydroxytoluene, 0.02 parts by mass of methoxyhydroquinone, and 0.02 parts by mass of zinc octylate were added and heated to 75° C., and 23.0 parts by mass of 2-hydroxyethyl acrylate was added dropwisely to the resultant mixture over 1 hour under stirring. After reaction at 75° C. for 3 hours after the addition, in a second step, 7.3 parts by mass of trimethylolpropane was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (B2).

Table 3 shows a raw material composition, the ratio [(b')/(a')] of the number of moles (b') of hydroxyl groups contained in the hydroxyl group-containing mono(meth)acrylate (b) to the number of moles (a') of isocyanate groups contained in the polyisocyanate, and the acryloyl group concentration and weight-average molecular weight of the resultant urethane acrylate resin (B3).

Comparative Production Example 4

In a four-neck flask provided with a stirrer, a gas inlet tube, a condenser, and a thermometer, 58.0 parts by mass of isophorone diisocyanate ("VESTNAT IPDI" manufactured by Evonik Degussa Japan Co., Ltd.), 0.1 parts by mass of tertiary-butyl hydroxytoluene, 0.02 parts by mass of methoxyhydroquinone, and 0.02 parts by mass of zinc octylate were added and heated to 75° C., and 30.3 parts by mass of 2-hydroxyethyl acrylate was added dropwisely to the resultant mixture over 1 hour under stirring. After reaction at 75° C. for 3 hours after the addition, in a second step, 11.7 parts by mass of trimethylolpropane was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (B4).

Table 3 shows a raw material composition, the ratio [(b')/(a')] of the number of moles (b') of hydroxyl groups contained in the hydroxyl group-containing mono(meth)acrylate (b) to the number of moles (a') of isocyanate groups contained in the isophorone diisocyanate (a), and the acryloyl group concentration and weight-average molecular weight of the resultant urethane acrylate resin (B4).

Comparative Production Example 5

In a four-neck flask provided with a stirrer, a gas inlet tube, a condenser, and a thermometer, in a first step, 70.7 parts by mass of polymethylene polyphenyl polyisocyanate ("Millionate MR-400" manufactured by Nippon Polyurethane Industry Co., Ltd., 29% by mass binuclear component, 71% by mass tri-nuclear or higher-nuclear component), 0.1 parts by mass of tertiary-butyl hydroxytoluene, 0.02 parts by mass of methoxyhydroquinone, and 0.02 parts by mass of zinc octylate were added and heated to 75° C., and 9.9 parts by mass of 2-hydroxyethyl acrylate was added dropwisely to the resultant mixture over 1 hour under stirring. After further reaction at 75° C. for 3 hours after the addition, in a second step, 19.9 parts by mass of trimethylolpropane was added and further reacted at 75° C., and the reaction was performed until an infrared absorption spectrum at 2250 cm$^{-1}$ showing an isocyanate group disappeared. As a result, gelation occurred.

Comparative Production Example 6

In a four-neck flask provided with a stirrer, a gas inlet tube, a condenser, and a thermometer, 16.3 parts by mass of tolylene diisocyanate, 0.1 parts by mass of tertiary-butyl hydroxytoluene, 0.02 parts by mass of methoxyhydroquinone, and 0.02 parts by mass of zinc octylate were added and heated to 75° C., and 3.7 parts by mass of 2-hydroxyethyl acrylate was added dropwisely to the resultant mixture over 1 hour under stirring. After reaction at 75° C. for 3 hours after the addition, in a second step, 80.0 parts by mass of polypropylene glycol ("Actcol D-3000" manufactured by Mitsui Chemicals Inc., number-average molecular weight 3000) was added and further reacted at 75° C., and the reaction was performed until an infrared absorption spectrum at 2250 cm$^{-1}$ showing an isocyanate group disappeared, thereby producing a urethane acrylate resin. The resin was used as a urethane acrylate resin (B6).

Table 3 shows a raw material composition, the ratio [(b')/(a')] of the number of moles (b') of hydroxyl groups contained in the hydroxyl group-containing mono(meth) acrylate (b) to the number of moles (a') of isocyanate groups contained in the aromatic polyisocyanate (a), and the acryloyl group concentration and weight-average molecular weight of the resultant urethane acrylate resin (B6).

and the comparative production examples was used and mixed with each of the compositions shown in Table 4 to Table 8, stirred by using a mixer (single-shaft dissolver), and then kneaded by using a three-roll mill to prepare an active energy ray-curable ink (mixing amounts in Table 4 to Table 8 are on a mass basis).

Each of evaluations below was made by using the resultant ink.

TABLE 3

|  |  |  |  | Comparative Production Example 1 | Comparative Production Example 2 | Comparative Production Example 3 | Comparative Production Example 4 | Comparative Production Example 5 | Comparative Production Example 6 |
|---|---|---|---|---|---|---|---|---|---|
|  |  |  | Resin No. | B1 | — | B3 | B4 | — | B6 |
| Reaction condition for producing urethane acrylate resin | First step | Polyfunctional aromatic isocyanate (a) | MR400 | 54.6 | 71.2 |  |  | 70.7 |  |
|  |  |  | MR200 |  |  |  |  |  |  |
|  |  |  | MR100 |  |  |  |  |  |  |
|  |  |  | TDI |  |  |  |  |  | 16.3 |
|  |  |  | IPDI |  |  |  | 58.0 |  |  |
|  |  |  | N3300 |  |  | 69.7 |  |  |  |
|  |  | Hydroxyl group-containing mono(meth)acrylate (b) | HEA | 45.4 | 17.8 | 23.0 | 30.3 | 10.0 | 3.7 |
|  | (b')/(a') Ratio [equivalent ratio] |  |  | 1.00 | 0.30 | 0.55 | 0.50 | 0.17 | 0.17 |
|  | Second step | Polyfunctional polyol (c) | TMP |  |  |  | 7.3 | 11.7 | 19.3 |
|  |  |  | GLY |  | 11.0 |  |  |  |  |
|  |  |  | NPG |  |  |  |  |  |  |
|  |  |  | TPG |  |  |  |  |  |  |
|  |  |  | 1,6-HG |  |  |  |  |  |  |
|  |  |  | PPG |  |  |  |  |  | 80.0 |
|  |  |  | PTMG |  |  |  |  |  |  |
| Property value of urethane acrylate resin | Acryloyl group concentration [mmol/g] |  |  | 3.91 | 1.53 | 1.99 | 2.60 | 0.86 | 0.32 |
|  | Weight-average molecular weight [Mw] |  |  | 1504 | Gelation | 10278 | 8532 | Gelation | 5680 |

Abbreviations in Table 1, Table 2, and Table 3 are as follows.

MR400: Polymethylene polyphenyl polyisocyanate ("Millionate MR-400" manufactured by Nippon Polyurethane Industry Co., Ltd.)

MR200: Polymethylene polyphenyl polyisocyanate ("Millionate MR-200" manufactured by Nippon Polyurethane Industry Co., Ltd.)

MR100: Polymethylene polyphenyl polyisocyanate ("Millionate MR-100" manufactured by Nippon Polyurethane Industry Co., Ltd.)

N3300: Hexamethylene diisocyanate-based isocyanurate-type polyisocyanate ("Sumidur N3300" manufactured by Sumitomo Bayer Urethane Co., Ltd.)

HEA: 2-Hydroxyethyl acrylate
TMP: Trimethylolpropane
GLY: Glycerin
TPG: Tripropylene glycol
1,6-HG: 1,6-Hexanediol
PPG: Polypropylene glycol ("Actcol D-3000" manufactured by Mitsui Chemicals Inc., number-average molecular weight 3000)
PTMG: Polytetramethylene glycol ("PTG1000SN" manufactured by Hodagaya Chemical Co., Ltd., number-average molecular weight 1000)

Examples 1 to 14 and Comparative Examples 5 to 8

Each of the urethane acrylate resins A1 to A17, B1, B3, B4, B6, B7, and B8 produced in the production examples

[Ink Flowability]

Ink flowability was measured by a spread meter method (parallel plate viscometer) according to JIS K5101, 5701. The property that the ink sandwiched between two parallel plates, which were horizontally placed, concentrically spread by the self-weight (115 grams) of a load plate was observed with time, and the diameter of ink spreading 60 seconds after was measured as a diameter value (DM [mm]). DM of 30 mm or more which caused good ink printability was determined as "acceptance".

[Misting Evaluation]

In an inkometer-type misting tester, 1.5 ml of ink was placed and rotated for 3 minutes at a machine temperature of 32° C. and 400 rpm. The degree of misting was compared by an increasing change in weight of paper arranged along a rotating body due to ink flying with rotation. In the case of poor misting, the amount of ink flying is increased, thereby increasing the weight of paper.

(Evaluation Criteria)

According to an increase in weight of paper,
1: 0.150 g or more
2: 0.125 g or more and less than 0.150 g
3: 0.075 g or more and less than 0.100 g
4: 0.050 g or more and less than 0.075 g
5: Less than 0.050 g

[Curing Method Using UV Lamp Light Source]

A colored article after ink application was irradiated with ultraviolet light (UV) to cure an ink coating film. An UV irradiation apparatus (manufactured by Eye Graphics Co., Ltd., provided with a cold mirror) accompanied by a water-cooled metal halide lamp (output 100 W/cm, one lamp) and a belt conveyor was used, and the colored article was placed on the conveyor and passed immediately below the lamp (irradiation distance: 11 cm) under predetermined conditions described below. The ultraviolet irradiation amount under each conditions was measured by using an accumulated ultraviolet intensity system (UNIMETER UIT-150-A/receiver UVD-C365, manufactured by Ushio Inc.).

[Method for Evaluating Active Energy Ray-Curable Ink: Curability]

Curability was determined by confirming the presence of scratch on a surface of the colored article by a claw scratch method immediately after irradiation. The colored article was irradiated with ultraviolet light while the conveyor speed (m/min) of the UV irradiation apparatus was changed, and the highest conveyor speed (m/min) causing no scratch even by strongly rubbing with a claw after curing was described. Therefore, it can be said that the higher the conveyor speed value, the better the curability of the ink.

[Evaluation of Offset Printability of Active Energy Ray-Curable Ink]

For the active energy ray-curable ink produced in each of the examples and the comparative examples, offset printing was performed at a printing speed of 9,000 sheets/hour by using, as an ultraviolet irradiation apparatus, an offset printing machine manufactured by Manroland Co., Ltd. (Manroland R700 printing machine, 40-inch width machine) provided with a water-cooled metal halide lamp (output 160 W/cm, using three lamps) manufactured by Eye Graphics Co., Ltd.

OK Top Coat Plus (57.5 kg, size A) manufactured by Oji Paper Co., Ltd. was used as printing paper. An aqueous solution prepared by mixing 98 parts by mass of tap water and 2 parts by mass of an etching solution ("FST-700" manufactured by DIC Corporation) was used as dampening water to be supplied to a plate surface.

In a method for evaluating offset ink printability, first a water supply dial of the printing machine was set to 40 (standard water amount), and an ink supply key was operated so that a print density was a standard process indigo concentration 1.6 (measured by a densitometer "Spectro-Eye" manufactured by X-Rite Inc. When the concentration was stabilized, the ink supply key was fixed.

Then, under the condition in which the ink supply key was fixed, printing was performed on 300 sheets under a condition in which the amount of water supplied was increased by changing the water supply dial from 40 to 55, and the indigo concentration of a printed matter after 300-sheet printing was measured. It can be evaluated that the smaller the decrease in indigo concentration of the printed matter even under the condition in which the water supply was increased, the more excellent emulsification suitability and the more excellent printability the ink has. The printability of the active energy ray-curable ink was evaluated according to criteria below.

A: Indigo concentration of printed matter of 1.5 or more
B: Indigo concentration of printed matter of 1.4 or more and less than 1.5
C: Indigo concentration of printed matter of less than 1.4

TABLE 4

| Printing ink composition | | | Example 1 | Example 2 | Example 3 | Example 4 | Example 5 |
|---|---|---|---|---|---|---|---|
| | Resin | A-1 | 26.0 | | | | |
| | | A-2 | | 23.0 | | | |
| | | A-3 | | | 22.0 | | |
| | | A-4 | | | | 27.0 | |
| | | A-5 | | | | | 19.0 |
| | Monomer | EO3TMPTA | 24.5 | 27.5 | 28.5 | 23.5 | 31.5 |
| | | BisAEO4DA | 10.0 | 10.0 | 10.0 | 10.0 | 10.0 |
| | | DPHA | 10.0 | 10.0 | 10.0 | 10.0 | 10.0 |
| | Pigment | FASTOGEN BLUE TGR-1 | 19.0 | 19.0 | 19.0 | 19.0 | 19.0 |
| | Extender pigment | High Filler #5000PJ | 2.0 | 2.0 | 2.0 | 2.0 | 2.0 |
| | Wax | S-381-N1 | 1.0 | 1.0 | 1.0 | 1.0 | 1.0 |
| | Polymerization inhibitor base | Q1301/MIRAMER M300 = 5/95 | 2.0 | 2.0 | 2.0 | 2.0 | 2.0 |
| | Initiator | Irgacure907 | 3.0 | 3.0 | 3.0 | 3.0 | 3.0 |
| | | EAB-SS | 2.5 | 2.5 | 2.5 | 2.5 | 2.5 |
| Evaluation result | Flowability | Parallel-plate viscometer DM [mm] | 37.5 | 37.0 | 35.0 | 39.5 | 34.5 |
| | Misting | Inkometer [400 rpm, 32° C., 3 min] | 4 | 4 | 4 | 3 | 4 |
| | Curability | Claw scratch [m/min.] | 50 | 50 | 50 | 45 | 45 |
| | Printability | Indigo concentration stability | A | A | B | B | B |

TABLE 5

| Printing ink composition | | | Example 6 | Example 7 | Example 8 | Example 9 | Example 10 | Example 11 |
|---|---|---|---|---|---|---|---|---|
| | Resin | A-6 | 25.0 | | | | | |
| | | A-7 | | 23.0 | | | | |
| | | A-8 | | | 27.0 | | | |
| | | A-9 | | | | 20.0 | | |
| | | A-10 | | | | | 27.0 | |
| | | A-11 | | | | | | 24.0 |
| | Monomer | EO3TMPTA | 25.5 | 27.5 | 23.5 | 30.5 | 23.5 | 26.5 |
| | | BisAEO4DA | 10.0 | 10.0 | 10.0 | 10.0 | 10.0 | 10.0 |
| | | DPHA | 10.0 | 10.0 | 10.0 | 10.0 | 10.0 | 10.0 |

TABLE 5-continued

|  |  |  | Example 6 | Example 7 | Example 8 | Example 9 | Example 10 | Example 11 |
|---|---|---|---|---|---|---|---|---|
|  | Pigment | FASTOGEN BLUE TGR-1 | 19.0 | 19.0 | 19.0 | 19.0 | 19.0 | 19.0 |
|  | Extender pigment | High Filler #5000PJ | 2.0 | 2.0 | 2.0 | 2.0 | 2.0 | 2.0 |
|  | Wax | S-381-N1 | 1.0 | 1.0 | 1.0 | 1.0 | 1.0 | 1.0 |
|  | Polymerization inhibitor base | Q1301/MIRAMER M300 = 5/95 | 2.0 | 2.0 | 2.0 | 2.0 | 2.0 | 2.0 |
|  | Initiator | Irgacure907 | 3.0 | 3.0 | 3.0 | 3.0 | 3.0 | 3.0 |
|  |  | EAB-SS | 2.5 | 2.5 | 2.5 | 2.5 | 2.5 | 2.5 |
| Evaluation result | Flowability | Parallel-plate viscometer DM [mm] | 39.5 | 38.0 | 38.0 | 37.0 | 38.5 | 38.0 |
|  | Misting | Inkometer [400 rpm, 32° C., 3 min] | 4 | 5 | 3 | 3 | 3 | 3 |
|  | Curability | Claw scratch [m/min.] | 45 | 45 | 45 | 45 | 45 | 40 |
|  | Printability | Indigo concentration stability | A | A | B | B | B | B |

TABLE 6

|  |  |  | Example 12 | Example 13 | Example 14 | Example 15 | Example 16 |
|---|---|---|---|---|---|---|---|
| Printing ink composition | Resin | A-12 | 27.0 |  |  |  |  |
|  |  | A-13 |  | 18.0 |  |  |  |
|  |  | A-14 |  |  | 18.0 |  |  |
|  |  | A-15 |  |  |  | 28.0 |  |
|  |  | A-16 |  |  |  |  | 26.0 |
|  | Monomer | EO3TMPTA | 23.5 | 32.5 | 32.5 | 22.5 | 24.5 |
|  |  | BisAEO4DA | 10.0 | 10.0 | 10.0 | 10.0 | 10.0 |
|  |  | DPHA | 10.0 | 10.0 | 10.0 | 10.0 | 10.0 |
|  |  | DTMPTA |  |  |  |  |  |
|  |  | TMPTA |  |  |  |  |  |
|  | Pigment | FASTOGEN BLUE TGR-1 | 19.0 | 19.0 | 19.0 | 19.0 | 19.0 |
|  | Extender pigment | High Filler #5000PJ | 2.0 | 2.0 | 2.0 | 2.0 | 2.0 |
|  | Wax | S-381-N1 | 1.0 | 1.0 | 1.0 | 1.0 | 1.0 |
|  | Polymerization inhibitor base | Q1301/MIRAMER M300 = 5/95 | 2.0 | 2.0 | 2.0 | 2.0 | 2.0 |
|  | Initiator | Irgacure907 | 3.0 | 3.0 | 3.0 | 3.0 | 3.0 |
|  |  | EAB-SS | 2.5 | 2.5 | 2.5 | 2.5 | 2.5 |
| Evaluation result | Flowability | Parallel-plate viscometer DM [mm] | 40.5 | 35.0 | 33.5 | 39.5 | 40.0 |
|  | Misting | Inkometer [400 rpm, 32° C., 3 min] | 3 | 3 | 3 | 4 | 4 |
|  | Curability | Claw scratch [m/min.] | 45 | 35 | 35 | 50 | 50 |
|  | Printability | Indigo concentration stability | B | B | B | B | A |

TABLE 7

|  |  |  | Example 17 | Example 18 | Example 19 | Example 20 |
|---|---|---|---|---|---|---|
| Printing ink composition | Resin | A-17 | 24.0 | 25.0 | 21.5 | 22.5 |
|  | Monomer | EO3TMPTA | 26.5 | 25.5 |  |  |
|  |  | BisAEO4DA | 10.0 |  | 10.0 |  |
|  |  | DPHA | 10.0 | 10.0 | 10.0 | 10.0 |
|  |  | DTMPTA |  | 10.0 |  | 10.0 |
|  |  | TMPTA |  |  | 29.0 | 28.0 |
|  | Pigment | FASTOGEN BLUE TGR-1 | 19.0 | 19.0 | 19.0 | 19.0 |
|  | Extender pigment | High Filler #5000PJ | 2.0 | 2.0 | 2.0 | 2.0 |
|  | Wax | S-381-N1 | 1.0 | 1.0 | 1.0 | 1.0 |
|  | Polymerization inhibitor base | Q1301/MIRAMER M300 = 5/95 | 2.0 | 2.0 | 2.0 | 2.0 |
|  | Initiator | Irgacure907 | 3.0 | 3.0 | 3.0 | 3.0 |
|  |  | EAB-SS | 2.5 | 2.5 | 2.5 | 2.5 |

TABLE 7-continued

| | | | Example 17 | Example 18 | Example 19 | Example 20 |
|---|---|---|---|---|---|---|
| Evaluation result | Flowability | Parallel-plate viscometer DM [mm] | 40.5 | 39.5 | 39.0 | 39.0 |
| | Misting | Inkometer [400 rpm, 32° C., 3 min] | 4 | 4 | 4 | 4 |
| | Curability | Claw scratch [m/min.] | 50 | 40 | 40 | 30 |
| | Printability | indigo concentration stability | A | B | B | B |

TABLE 8

| | | | Comparative Example 1 | Comparative Example 2 | Comparative Example 3 | Comparative Example 4 |
|---|---|---|---|---|---|---|
| Printing ink composition | Resin | B-1 | 32.0 | | | |
| | | B-3 | | 23.0 | | |
| | | B-4 | | | 24.0 | |
| | | B-6 | | | | 30.0 |
| | Monomer | EO3TMPTA | 18.5 | 27.5 | 26.5 | 20.5 |
| | | BisAEO4DA | 10.0 | 10.0 | 10.0 | 10.0 |
| | | DPHA | 10.0 | 10.0 | 10.0 | 10.0 |
| | | DTMPTA | | | | |
| | | TMPTA | | | | |
| | Pigment | FASTOGEN BLUE TGR-1 | 19.0 | 19.0 | 19.0 | 19.0 |
| | Extender pigment | High Filler #5000PJ | 2.0 | 2.0 | 2.0 | 2.0 |
| | Wax | S-381-N1 | 1.0 | 1.0 | 1.0 | 1.0 |
| | Polymerization inhibitor base | Q1301/MIRAMER M300 = 5/95 | 2.0 | 2.0 | 2.0 | 2.0 |
| | Initiator | Irgacure907 | 3.0 | 3.0 | 3.0 | 3.0 |
| | | EAB-SS | 2.5 | 2.5 | 2.5 | 2.5 |
| Evaluation result | Flowability | Parallel-plate viscometer DM [mm] | 42 | 29 | 36 | 26 |
| | Misting | Inkometer [400 rpm, 32° C., 3 min] | 1 | 2 | 2 | 2 |
| | Curability | Claw scratch [m/min.] | 20 | 10 | 20 | 20 |
| | Printability | Indigo concentration stability | B | C | C | C |

Abbreviations in Table 4 to Table 8 are as follows.

EO3TMPTA: Ethylene oxide-modified trimethylolpropane triacrylate ("MIRAMER M3130" manufactured by MIWON Co., Ltd., viscosity: 50 to 70 mPa·s (25° C.), average number of ethylene oxides added per molecule: 3)

BisAEO4DA: Bisphenol A ethylene oxide-modified diacrylate ("MIRAMER M240" manufactured by MIWON Co., Ltd., 900 to 1300 mPa·s (25° C.))

DPHA: Dipentaerythritol hexaacrylate ("MIRAMER M600" manufactured by MIWON Co., Ltd., 4000 to 7000 mPa·s (25° C.))

DTMPTA: Ditrimethylolpropane tetraacrylate ("MIRAMER M410" manufactured by MIWON Co., Ltd.)

TMPTA: Trimethylolpropane triacrylate ("MIRAMER M300" manufactured by MIWON Co., Ltd.)

FASTOGEN BLUE TGR-1: Phthalocyanine blue ("FASTOGEN BLUE TGR-1" manufactured by DIC Corporation)

Irgacure 907: α-Aminoalkylphenone ("Irgacure 907" manufactured by BASF)

EAB-SS: 4,4'-Bisdimethylaminobenzophenone ("EAB-SS" manufactured by Daido Chemical Corporation)

Q1301: N-Nitrosophenylhydroxylamine aluminum salt ("Q-1301" manufactured by Wako Pure Chemical Industries, Ltd.)

High Filler #5000PJ: Hydrated magnesium silicate (extender pigment "High Filler #5000PJ" manufactured by Matsumura Sangyo Co., Ltd.)

S-381-N1: Polyolefin wax (wax "S-381-N1" manufactured by Shamrock Technologies Inc.)

The invention claimed is:

1. An active energy ray-curable composition comprising a urethane (meth)acrylate resin (A), a polymerization initiator (B), and a polymerizable diluent (C) wherein
the urethane (meth)acrylate resin (A) is produced by using an aromatic polyisocyanate (a), a hydroxyl group-containing mono(meth)acrylate (b), and a polyol (c) as essential reaction raw materials so that the ratio [(b')/(a')] of the number of moles (b') of hydroxyl groups contained in the hydroxyl group-containing mono (meth)acrylate (b) to the number of moles (a') of isocyanate groups contained in the aromatic polyisocyanate (a) is within a range of 0.99 to 0.40, and the urethane (meth)acrylate resin (A) has a (meth)acryloyl group concentration within a range of 1.5 to 4.0 mmol/g,
the polyol (c) is an aliphatic polyhydric alcohol having a molecular weight within a range of 90 to 400, and
the polymerizable diluent (C) includes an alkylene oxide-added aliphatic polyhydric alcohol poly(meth)acrylates.

2. The active energy ray-curable composition according to claim 1, wherein the polymerizable diluent (C) further contains alkylene oxide-added bisphenol alcohol poly(meth) acrylate.

3. The active energy ray-curable composition according to claim 1, wherein the urethane (meth)acrylate resin (A) has a weight-average molecular weight (Mw) within a range of 3,000 to 40,000.

4. An active energy ray-curable printing ink comprising the active energy ray-curable composition according claim 1.

5. The active energy ray-curable printing ink according to claim 4, wherein the active energy ray-curable printing ink is an offset printing ink.

6. A printed matter produced by printing the active energy ray-curable printing ink according to claim 5.

* * * * *